United States Patent
Patel et al.

(10) Patent No.: US 12,258,515 B2
(45) Date of Patent: Mar. 25, 2025

(54) INVERT EMULSIFIER FOR USE IN INVERT EMULSION DRILLING FLUIDS

(71) Applicant: Gumpro Drilling Fluids PVT.LTD, Mumbai (IN)

(72) Inventors: Arvind Patel, Sugarland, TX (US); Anil Kumar Singh, Mumbai (IN); Sakshi Indulkar, Mumbai (IN); Vivek Gupta, Mumbai (IN); Nikhil Bidwai, Mumbai (IN); Kartiki Dewalkar, Mumbai (IN); Vijay Kshirsagar, Mumbai (IN)

(73) Assignee: Gumpro Drilling Fluids PVT. LTD, Maharashtra (IN)

( * ) Notice: Subject to any disclaimer, the term of this patent is extended or adjusted under 35 U.S.C. 154(b) by 0 days.

(21) Appl. No.: 17/476,042

(22) Filed: Sep. 15, 2021

(65) Prior Publication Data

US 2022/0089932 A1 Mar. 24, 2022

(30) Foreign Application Priority Data

Sep. 18, 2020 (IN) .............................. 202021040521

(51) Int. Cl.
*C09K 8/36* (2006.01)
(52) U.S. Cl.
CPC ..................................... *C09K 8/36* (2013.01)
(58) Field of Classification Search
CPC ..................................................... C09K 8/36
See application file for complete search history.

(56) References Cited

U.S. PATENT DOCUMENTS

| | | |
|---|---|---|
| 3,169,113 A | 2/1965 | Kirkpatrick et al. |
| 4,501,672 A | 2/1985 | Connell et al. |
| 4,508,628 A | 4/1985 | Walker et al. |
| 4,544,756 A | 10/1985 | Patel |
| 4,575,428 A | 3/1986 | Clapper et al. |
| 4,658,036 A | 4/1987 | Schilling |
| 5,300,235 A | 4/1994 | Clewlol et al. |
| 5,322,640 A | 6/1994 | Byrne et al. |
| 5,869,433 A | 2/1999 | Patel |
| 6,303,079 B1 * | 10/2001 | Meyer .................. C07D 233/18 106/14.12 |
| 7,057,050 B2 | 6/2006 | Meyer |
| 7,247,604 B2 | 7/2007 | Dalmazzone et al. |
| 8,765,644 B2 | 7/2014 | Yu et al. |
| 10,435,611 B2 | 10/2019 | Hurd et al. |

FOREIGN PATENT DOCUMENTS

| | | |
|---|---|---|
| WO | WO 89/11516 | 11/1989 |
| WO | WO-2019147515 A1 * | 8/2019 |

* cited by examiner

*Primary Examiner* — Aiqun Li
(74) *Attorney, Agent, or Firm* — Thorpe North & Western, LLP

(57) ABSTRACT

An oil soluble invert emulsifier and a process for preparation thereof, including invert emulsion drilling fluid compositions and their use, are described. The oil soluble invert emulsifier is synthesized from fatty acid reaction with polyalkylene polyamines and unsaturated mono carboxylic acids. The emulsifier is further modified with multivalent alkali metal salts. The emulsifier stabilizes the invert emulsion drilling fluid at temperatures exceeding 400° F. and imparts improved fluid properties.

22 Claims, No Drawings

INVERT EMULSIFIER FOR USE IN INVERT EMULSION DRILLING FLUIDS

RELATED APPLICATION

This application claims priority to Indian Patent Application No. 202021040521 filed on Sep. 18, 2020, which is incorporated herein by reference.

FIELD OF THE INVENTION

The present invention relates to invert emulsifier compositions for use in invert water-in-oil emulsion drilling fluids. The emulsifier is a reaction product of fatty acid, polyalkylene polyamine and unsaturated mono carboxylic acid and imparts stability to the drilling fluid at elevated temperature as well as improved fluid properties

BACKGROUND OF THE INVENTION

Drilling fluids or muds are used in drilling oil and gas wells. Drilling fluids aid in lubricating the drill bit and establishing a fluid counter-pressure to prevent high-pressure oil, gas and/or water formation fluids from entering the well prematurely, thus preventing the collapse of the uncased wellbore. Drilling fluids extract drill cuttings from the drilling area and transport these to the surface and also cool and clean the drill bit while reducing friction between the drill string and the sides of the wellbore Oil-based drilling fluids contain water emulsified in oil and are known as water-in-oil or invert emulsion drilling fluids commonly containing at least 5% and up to as much as 50%, by volume of water or aqueous brine (salt solution).

Invert emulsion drilling fluids are typically obtained by mixing hydrocarbon oil with water or brine under high shear conditions and in the presence of a suitable emulsifier. The emulsifier is required not only to form a stable dispersion of water droplets in the oil phase, but also to maintain any solids such as weighting material additives (e.g., barites) or drill cuttings in an oil-wet state. Other additives incorporated into invert emulsion systems include organo clays and materials that increase fluid viscosity, fluid loss control additives, oil-wetting agents, rheology modifiers and lubricants.

U.S. Pat. No. 4,544,756 discloses zwitterionic 2-alkyl imidazolines as emulsifying agents for oil based drilling fluids are prepared by reacting fatty acids, poly-alkylene polyamines and activated dicarboxylic acid having cis-configuration. The patent omitted mono carboxylic acids as being not useful for preparing such zwitterionic imidazoline emulsifiers.

U.S. Pat. No. 8,765,644 relates to emulsifiers for oil based drilling fluids and muds comprising an emulsifier based on the polyamides derived from fatty acid/carboxylic acid and optionally alkoxylated polyamines.

U.S. Pat. No. 10,435,611 describes methods for making emulsifiers that can include one or more tall oils and one or more triamides, emulsified drilling fluids, and methods for using same. The specification teaches amide products obtained by reacting triamides with dicarboxylic acids to yield amide derivatives.

U.S. Pat. No. 5,869,433 discloses non-fluorescing invert emulsion drilling fluid and a process of preparing same. The emulsifiers used in this disclosure are prepared from saturated fatty acids, polyalkylene polyamines and saturated dicarboxylic acid like succinic acid U.S. Pat. Nos. 4,508,628 and 4,575,428 disclose invert emulsion drilling fluid emulsifiers derived from polyamines. The preferred polyamide emulsifiers are prepared by first reacting a polyamine with fatty acid in order to form a amidoamine and thereafter reacting the amidoamine intermediate with a dicarboxylic acid (in U.S. Pat. No. 4,508,628) or tricarboxylic acid (in U.S. Pat. No. 4,575,428).

U.S. Pat. No. 7,247,604 generally relates to alkanol-amide based emulsifiers obtained by transamidification of fatty acid esters and mono-alcohols or oils of a plant of animal origin (triglyceride) with alkanolamine. The oil based drilling fluid made with the emulsifier and co-surfactant was claimed having temperature-stable, non-toxic to the environment, and high temperature and high pressure (HTHP) well drilling, completion or workover application properties.

U.S. Pat. No. 3,169,113 discloses emulsifiers for water-in-oil acidic fracturing fluids. The disclosed emulsifier has two components: (a) a 9-18 carbon monocarboxylic acid fatty acid salt of a partial amide of a polyalkylene polyamine with 2-6 carbon alkylene groups and 3-5 amino nitrogen in which at least two amino groups are amidified with 9-18 carbon monocarboxylic fatty acids and wherein there is at least one nonamidified amino group forming a salt with the acid and, (b) a polyamide of an alkylene polyamine with 2-6 carbon alkylene groups and 2-5 amino nitrogen and a 9-18 carbon monocarboxylic fatty acid.

U.S. Pat. No. 4,501,672 discloses fluid loss reducing additives for oil-based working fluids. The additive is obtained by reacting 1 mole of dialkylene triamine with 2 moles of fatty acid. Examples specifically covers the bridging of diethylene triamine dioleylamide with maleic anhydride.

WO 89/11516 discloses oil-based emulsifiers for drilling fluids that are the reaction product of one or two moles of an amide-amine or a hydroxylalkylamide with one to five moles of a dicarboxylic acid or an acid anhydride.

U.S. Pat. No. 4,658,036 discloses an invert emulsion and a process of preparing same. The emulsifiers are prepared by reacting at least one tall oil fatty acid with acrylic acid, maleic anhydride, or fumaric acid, followed by reaction with diethylene triamine and at least one tall oil fatty acid in order to give the invert emulsifier. Reaction of maleic, fumaric or acrylic acid first reacted with fatty acids to form Diels-Alder adduct which was reacted to form poly amides.

A variety of imidazolines and zwitterionic imidazolines have been prepared for use as corrosion inhibitors, especially in water based heavy brine environment. Such corrosion inhibitors are cited in U.S. Pat. Nos. 7,057,050; 5,322,640; 5,300,235. These imidazolines and many others are either different and/or made water soluble to be effective as corrosion inhibitors however they will not be effective invert emulsifiers.

The invert emulsifiers amido amines, poly amides and imidazoline derivatives of the prior art emulsifiers do not provide drilling fluids which are stable at high temperatures. The prior art cited does not teach the reaction product of unsaturated mono carboxylic acid with the imidazolines of the present invention.

SUMMARY OF THE INVENTION

It is an object of the present invention to provide an improved zwitterionic imidazoline invert emulsifier, derived by reacting unsaturated mono carboxylic acid with the reaction product of fatty acids and polyalkylene polyamines. The zwitterionic imidazolines of this inventions are effective for various mud weights and at various oil water ratios. The surfactant thus synthesized is oil soluble and provides a stable invert emulsion with aqueous phase of brine with salts such as calcium chloride dispersed in a non-aqueous oil phase such as diesel, mineral oil or any synthetic oil. It is another objective of the invention to provide improved calcium and magnesium salts of the zwitterionic imidazoline invert emulsifier. The invert emulsion drilling fluid of this invention formulated using the novel invert emulsifier, is characterized by its enhanced performance characteristics such as high temperature stability, higher Emulsion Stability (ES) values, low fluid losses without water in filtrate and improved rheology parameters.

Such stabilized invert emulsion fluids typically have density of up to 22 ppg (pounds per gallon) and can withstand temperatures in excess of 400° F. To obtain a target density, weighing materials like calcium carbonate, barite, hematite, finely grinded manganese tetra oxide, galena, inorganic dissolved or undissolved salts may be used.

Invert emulsions stabilized by the surfactant of this invention synthesized using unsaturated mono carboxylic acid, can be ascertained for stability by zero water content in the fluid loss filtrate at temperature of 300° F. and differential pressure of 500 psi. The invert emulsifiers of the present invention are not only excellent emulsifiers for oil based drilling fluids, but also effective wetting agents and fluid loss control agents in invert (water-in-oil) systems.

DETAILED DESCRIPTION OF THE INVENTION

The invert emulsifier of the present invention is obtained by reacting long chain fatty acids with polyalkylene polyamines to form imidazolines, which are further reacted with unsaturated mono carboxylic acid to form the zwitterionic imidazoline derivatives of this invention.

The fatty acids used to make the imidazolines of this invention contain from about 14 to 22 carbon atoms and may be saturated or unsaturated, including but not limited to, vegetable oil based fatty acids, tall oil based fatty acids, tallow oil based fatty acids, distilled lauric, oleic, palmitic acid, and the like and combinations thereof. Particularly useful are acid mixtures containing a greater proportion of mono- or di-unsaturated fatty acids containing 16 to 18 carbon atoms. Commercial mixtures of acids such as tall oil and vegetable oil and the like may be used satisfactorily.

The amines used are polyalkylene polyamines and include diethylene triamine, triethylene tetramine, tetraethylene pentamine, amino ethyl ethanol amine and the like. The general formula of poly-alkylene polyamine is given in following formula:
NH2-(CH2-CH2-NH—CH2-CH2-NH)n-H, where n is an integer from 1 to 6. For example, when n=1 then NH2-CH2-CH2-NH—CH2CH2-NH2 is diethylene triamine. In some embodiments, the terminal amino group of polyamines can be replaced by hydroxyl group for example in amino ethyl ethanol amine of formula NH2-CH2-CH2-NH—CH2-CH2-OH.

The unsaturated mono carboxylic acids contain at least one carbon-to-carbon olefinic double bond, and in some cases in an alpha-beta position in the molecule with respect to a carboxylic acid group, i.e. —R—CH=CH—COOH, and R is hydrogen or alkylene group with 1 to 5 and can be saturated or unsaturated.

Further, the unsaturated mono carboxylic acid of this invention may contain more than one double bond. The unsaturated carboxylic acid may be aliphatic or cyclic, provided it is mono carboxylic acid. The examples of poly unsaturated mono carboxylic acids are 2,4-hexadiene 1-carboxylic acid and 1,4-cyclohexadine 1-carboxylic acid. In some cases, the acids contain 3 to 8 carbon atoms. In one particular example, unsaturated carboxylic acids of the invention have a double bond conjugated to a carbonyl group of said carboxylic acid. Typical carboxylic acids meeting these criteria include but are not limited to, acrylic acid, methacrylic acid, crotonic acid, 2-butenoic acid, 2-pentenoic acid, 2-hexenoic acid, 1,4-cyclohexadiene 1-carboxylic acid, and the like.

In the reaction to form the imidazoline intermediate product, the molar ratio of amine to fatty acid will be varied from one mole of amine to about 0.5 to 3 moles of fatty acid. Good yields and products are obtained when the molar amount of fatty acid is greater than one mole per mole of amine to less than 2 moles of fatty acid per mole of amine. However, the optimum ratios depend upon the type of fatty acid and polyamine utilized, and one skilled in art can obtain the optimum ratio by experimentation and evaluation in drilling fluid formulations.

In the reaction of the imidazoline with the unsaturated mono carboxylic acids as defined herein, a molar ratio of about one mole of imidazoline to about 0.2 to one or more moles of unsaturated mono carboxylic acid is used. Good yields and products are obtained when about 1:1 mole ratios of imidazoline and carboxylic acids are used. Again, one skilled in art can determine the optimum molar ratios by varying the ratios and evaluations in invert emulsion drilling fluids.

As an example, emulsifying agents of this invention can be prepared by reacting a polyalkylene polyamine with a fatty acid to form an amide at about 150° C. The reaction product is then heated to a higher temperature of about 235° C. to convert the amide or aminoamide to a 2-alkyl imidazoline as shown in Structure I. Where R1 is alkyl group derived from fatty acid and R2 is a pendant group derived from polyalkylene polyamine and its derivatives as defined in this disclosure.

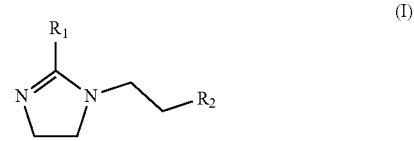

(I)

The imidazoline of Structure I is further reacted with unsaturated mono carboxylic acid at temperature of about 90° C. to about 190° C. These carboxylic acids can have an activated carbon-to-carbon double bond to form a salt that rearranges to the zwitterionic invert emulsifying agent of this invention as depicted in Structure II. Where, R1 and R2 have the same meaning as defined above and R3 is the anionic pendant group derived from unsaturated mono carboxylic acids of this invention.

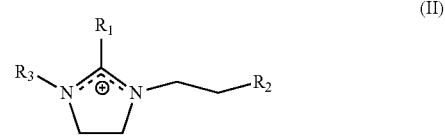

(II)

Where
a. R1 is an alkyl radical derived from fatty acid
b. R2 is a $NH_2$, NHCOR1, OH, OCOR1, polyalkylene polyamine
c. R3 is an anionic alkanediyl radical derived from unsaturated mono-carboxylic acid containing 3-8 carbon atoms.

Vegetable oil, $NH_2$ from diethylene triamine and acrylic acid are examples of R1, R2 and R3, respectively.

During the manufacturing of the imidazoline derivatives of this invention, variation in reaction conditions may be employed. However, mainly, the polyalkylene polyamine is pre heated to about 70-100° C. in a reaction vessel before the fatty acid is added so that the resulting salt will be in a liquid state, the fatty acid is then added gradually and the reaction mixture is heated to about 140-150° C. In some cases, the fatty acid is added to amine to maximize the production of the amide product. To complete the condensation reaction to form the amide, the reaction mixture is refluxed for one hour and 1.0 mole of water per mole of fatty acid is distilled off as a condensation reaction by product.

To convert the amides to the desired 2-alkyl imidazolines, the reaction mixture temperature is gradually increased to about 190° C., often in the range of 235° C.-250° C., for about 45 minutes to one hour. The rate and extent of conversion of amides to the imidazolines is ascertained by collecting and measuring the volume of water produced, there being an additional one mole of water formed for each mole of imidazoline formed.

To obtain the zwitterionic imidazoline reaction products of this invention, the 2-alkyl imidazoline is brought to a temperature at or below the boiling point or above the melting point of the unsaturated mono carboxylic acid to be used. The mono carboxylic acid is added gradually to control the reflux. The reaction is typically carried out at around 80-180° C. After adding the mono carboxylic acid, the reaction may be conducted at higher temperatures if so required. After about one hour at this temperature the reaction mixture is then cooled to about 50° C. Additional appropriate solvents and pour point depressant may also be added. The zwitterionic imidazoline reaction product obtained is oil soluble.

The following are the illustrative examples of products prepared and utilized in this invention.

General Procedure to Make Illustrative Examples of Invert Emulsifiers:

1.0 mole weight of diethylene triamine was placed in a reaction vessel equipped with stirring, heating and condenser means, and heated to 80° C. 1.67 mole weight of distilled tall oil fatty acid was gradually added to the reaction vessel. The exotherm was observed. The mixture was then refluxed for 30 minutes at 135° C. At this point a water trap was connected and water was distilled off while heating the reaction to 160° C. The amount of condensate collected was 1.67 moles. The mixture was then heated to 245° C. over a period of 30-45 minutes. During this time, an additional 1.0 mole of water was collected. This confirmed the formation of the 2-alkyl imidazoline. The reaction mixture was cooled to 90° C., and 1.0 mole weight of organic carboxylic acid was added to the reaction vessel and the mixture heated to reflux at 180° C. to 190° C. for one hour. The water in the reaction was completely distilled off to ensure that no excess water was left in the product. The mixture was cooled and appropriate amount of synthetic hydrocarbon and butoxy tri glycol (BTG) was stirred in to obtain a flowable final product. A total of about 20-30% by volume of the solvents were used to obtain final product. Following illustrative examples were prepared accord the general procedure described herein, however as mentioned earlier many variations in chemical formulations and reaction conditions can be executed, depending upon the availability and cost of raw materials, and end use and required functional characteristics of products.

Example I 1.0 mole of diethylene triamine was reacted with 1.67 mole of vegetable based fatty acid to obtain 2-alkyl imidazoline according to the general procedure described above. The reaction mixture was cooled to 150° C. and 1.0 mole of fumaric acid was added. The reaction mixture was heated to 180° C. After one hour, the reaction mixture was cooled to 120° C. and an appropriate amount of solvent and BTG were stirred into the product to make about 70-80% active flowable final product formulation.

Example II 1.0 mole of diethylene triamine was reacted with 1.67 of tall oil fatty acid to obtain 2-alkyl imidazoline according to the process described above. The reaction mixture was cooled to 150° C., and 1.0 mole of fumaric acid was added. The reaction mixture was heated to 180° C. for one hour. The reaction mixture was then cooled to 120° C. and an appropriate amount of solvent and BTG were stirred into the product to make about 70-80% active flowable final product formulation.

Example III 1.0 mole of diethylene triamine was reacted with 1.67 of vegetable based fatty acid to obtain 2-alkyl imidazoline according to the described procedure. The reaction mixture was cooled to 150° C., and 1.0 mole of citric acid was added. The reaction mixture was heated to 180° C. for one hour. The reaction mixture was cooled to 120° C. and an appropriate amount of solvent and BTG were stirred into the product to make about 70-80% active flowable final product formulation.

Example IV 1.0 mole of diethylene triamine was reacted with 1.67 of vegetable based fatty acid to obtain 2-alkyl imidazoline according to the procedure described above. The reaction mixture was cooled to 130° C. and 1.0 mole of acrylic acid was added. The reaction mixture was heated to 180° C. for one hour. The reaction mixture was cooled to 120° C. and appropriate amount of solvent and BTG were stirred into the product to make about 70-80% active and flowable final product formulation.

Example V 1.0 mole of diethylene triamine was reacted with 1.67 of tall oil fatty acid to obtain 2-alkyl imidazoline according to the procedure described in Example I. The reaction mixture was cooled to 130° C., and 1.0 mole of acrylic acid was added. The reaction mixture was heated to 180° C. for one hour. The reaction mixture was cooled to 120° C. and appropriate amount of solvent and BTG were stirred into the product to make about 70-80% active and flowable final product formulation.

In one example, the invert emulsifier of this invention comprises a reaction product of vegetable oil fatty acid, diethylene triamine and acrylic acid.

It is contemplated according to this invention that the emulsifier products can further be neutralized with multivalent alkali metal salts prior to their application or in-situ in drilling fluid formulations. Alkali metals used for neutralization can include, but are not limited to, calcium hydroxide, calcium oxide, magnesium hydroxide, magnesium oxide, and like. Those skilled in art can appropriately use other neutralizing agents including organic amines, depending upon the final application of the product and fluid formulation.

Unsaturated mono carboxylic derived products of this invention can form inter molecular salts upon neutralization with such multivalent cations as opposed to intra molecular salts in commercial dicarboxylic or poly carboxylic acid derived products. For example, in Structure III, the acrylic acid based product of Example IV of this invention forms inter molecular salt (within two groups) with calcium divalent cation while the standard commercial dicarboxylic fumaric acid based product of Example I form intra molecular salt (within single group) under the same conditions. The neutralized invert emulsifiers of this invention offers improved drilling fluid formulations.

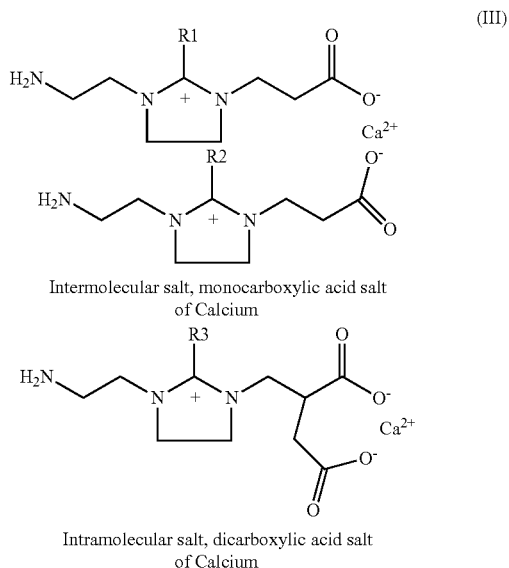

Evaluation:

To measure the effectiveness of these products, the above prepared products were evaluated in various drilling fluid formulations according to the standard API Recommended Practice procedure given in API RP 13 B which is the standard procedure for testing invert emulsion drilling fluids.

Drilling Fluid Formulations:

Formulations of invert emulsion drilling fluids are widely known to those who are skilled in art.

An invert water-in-oil emulsion has oil as the continuous phase. The compositions of this invention may comprise 100% to 30% oil base fluid by volume of the total composition. Water insoluble base fluids, such as diesel, mineral oils, poly alpha olefins and the like are utilized as continuous phase. Water, usually in the form of brine, is added to these compositions and emulsified as internal phase in oils. Water may be added to the drilling fluid up to a volume of 70%. In one example, water is added from 5% to 50% by volume, and in one particular example water is added from 10% to 30% by volume. In one example, the aqueous phase is divalent cationic brine. These brines contain salts such as $CaCl_2$ or $CaBr_2$ in varying amounts. Typically, 20 to 30% calcium chloride brine is emulsified in hydrocarbon oil phase.

The compositions of this invention require invert emulsifiers to incorporate the brine or water phase into the hydrocarbon continuous phase. In general, it is envisaged that the imidazoline based emulsifiers of the present invention will be used in amounts of up to 20 lbs/bbl but typically in the range of 2-12 lbs/bbl.

The Imidazoline of this inventions have shown to be effective for various mud weights and at various oil water ratios. The emulsifiers that have demonstrated utility in the emulsions of this invention are zwitterionic imidazolines which are prepared from fatty acids, polyalkylene polyamines and unsaturated mono carboxylic acids as described previously. The typical carboxylic acids used are unsaturated mono carboxylic acids selected from acrylic acid, methacrylic acid, crotonic acid, 2-butenoic acid, 2-pentenoic acid, hexenoic acid and like of general formula R—CH═CH—COOH, where R is H or alkyl group having C1 to C5 carbon atoms, saturated or unsaturated. Other unsaturated mono carboxylic acids can also be utilized.

The surfactants that have demonstrated utility in the emulsions of this invention utilizes fatty acids derived from vegetable oil fatty acids, tall oil fatty acids, tallow oil fatty acids and combinations of the above. Blends of these materials as well as other surfactants may also be utilized.

The oil-based drilling fluid composition of this invention may optionally contain an additional oil wetting agent. The wetting agents included, but not limited to the present invention, are fatty acids, oxidized fatty acids, imidazolines and dodecyl benzene sulfonic acid. Blends of these materials as well as other wetting agents known to skilled in art can be used for this application. The amount of oil wetting agent used vary depending upon end use of drilling fluid formulation, generally about 0.1 to 10% by weight range is sufficient for most applications. Commercially available wetting agents, Gel Wet and GS Wet from Gumpro Drilling Fluids Pvt. Ltd (Gumpro DF), were utilized in the present disclosure.

Generally, organophilic clays such as amine treated clays are also used as viscosifiers in the oil-based drilling fluid composition of the present invention. Organophilic clay dry blend and wet process, commercially available from Gumpro DF were used in the Examples of the present disclosure. Other viscosifiers, such as oil soluble polymers, polyamide resins, polycarboxylic acids and soaps, can also be used. GS Vis SF poly amide resin available from Gumpro DF was used as non-clay viscosifier. The amount of viscosifier used in the composition can vary depending upon the end use of the composition. Generally, about 0.1% to 10% by weight range is sufficient for most applications.

The drilling fluid composition of this invention may optionally contain a weight material. The quantity depends upon the desired density and viscosity of the final composition. Weight materials can include, but are not limited to, barite, iron oxide, calcium carbonate, inorganic salts and the like. The weight material is typically added to result in a drilling fluid density of up to 24 pounds per gallon, often up to 18 pounds per gallon and in some examples up to 16.7 pounds per gallon.

Alkalinity agents are typically added to fluid formulations to make the soaps of emulsifiers and oil wetting agents to enhance the functional properties of surfactants and wetting agents. Many times excess alkalinity agents are utilized to combat the unexpected acid gasses intrusion from the formation. Typical alkalinity agents utilized are calcium or magnesium hydroxide or their oxides. However, many other alkalinity agents can be used and are available for those who are skilled in art.

Finally, fluid loss control agents, such as modified amine treated lignite, Gilsonite and oil soluble or oil dispersible polymers, can be added to the drilling fluid system of this invention. These products are commercially available from many companies. GS Trol and GS Trol L are commercially available products from Gumpro DF were utilized in current formulations.

The drilling fluid may also include other materials, such as mud thinners, lubricants and temperature stabilizers common to the development and formulation of drilling fluids provided that the additional materials do not interfere with the functional properties of other additives and fluid formulations of this invention.

The terms are used in the tables below are described as follows:

| | |
|---|---|
| GS Clay WP- | Organo clay Wet Processed from Gumpro DF |
| GS Clay DP- | Organo clay Dry Processed from Gumpro DF |
| Gel Wet- | Oxidized Fatty Acid from Gumpro DF |
| GS Vis SF- | Polymeric Viscosifier from Gumpro DF |
| GS Trol- | Fluid loss additive from Gumpro DF |
| GS Carb- | Calcium Carbonate from Gumpro DF |
| ppg | pounds per gallons |

Following formulations were prepared and utilized to evaluate the performance characteristics of invert emulsifiers of this invention (Examples IV and V) and were compared against the standard state of the art invert emulsifiers (Example I, II and III) prepared according to this disclosure. Diesel based 10.7 ppg invert emulsion drilling fluids with 80/20 Oil/Water ratio were prepared using 25% calcium chloride brine as dispersed phase. These mud formulations were prepared using five different invert emulsifiers as obtained from Example 1, Example 2, Example 3, Example 4 and Example 5.

These mud formulations prepared with various fluid additives, known to those skilled in art are given in following Table 1:

TABLE 1

| Additives | Order of addition | Mixing time on Silverson@ 6000 rpm | Amount of additive | Remarks |
|---|---|---|---|---|
| Base Oil Diesel | | | 171 ml | Commercial |
| GS Clay WP* | — | — | — | Available from Gumpro DF* |
| Lime | 1 | 5 min | 4.0 gms | Technical grade/commodity |
| Gel Wet* | 2 | 5 min | 10.0 gms | Oxidized Fatty Acid from Gumpro DF |
| Emulsifier | 2 | 5 min | 12.0 gms | Emulsifiers 1-5 derived from Examples I to V of the present disclosure |
| 25% CaCl2 Brine | 3 | 15 min | 75 ml | CaCl2 of 95% purity |
| GS Vis SF* | 4 | 10 min | 4.0 gms | Polymeric Viscosifier from Gumpro DF |
| GS Trol* | 5 | 5 min | 14 gms | Fluid loss additive from Gumpro DF |
| GS Carb* | 6 | 5 min | 20.0 gms | Calcium Carbonate From Gumpro DF |
| Barite | 7 | 10 min | 147.0 gms | Commodity |

*These drilling fluids additives are available from Gumpro Drilling Fluids Pvt. Ltd. L. B. S. Marg, Vikhroli West, Mumbai 400083 India.

Five drilling fluid formulations are formulated using the five emulsifiers prepared according to Examples I to V of the present disclosure. Formulations 1, 2 and 3 used traditionally known emulsifiers prepared from fumaric and citric acid. These emulsifiers are described in examples I-III. Formulations 1-3 were formulated for comparison purposes. Formulations 4 and 5 used the acrylic acid, unsaturated mono carboxylic acid based invert emulsifiers of the present invention as described in Examples IV and V. These drilling fluid formulations used polymeric viscosifier GS Vis SF available from Gumpro DF, instead of traditional organophilic clays. All the fluid formulations were heat aged at 350° F. and 400° F. for 16 hours. The fluid properties were measured at 120° F. before and after heat aging cycles according to API procedures. The data is recorded in Table 2 and compared for these fluid formulations.

TABLE 2

| | Formulation 1 | | | Formulation 2 | | | Formulation 3 | | | Formulation 4 | | | Formulation 5 | | |
|---|---|---|---|---|---|---|---|---|---|---|---|---|---|---|---|
| RPM | BHR | 350 | 400 | BHR | 350 | 400 | BHR | 350 | 400 | BHR | 350 | 400 | BHR | 350 | 400 |
| 600 | 74 | 73 | 58 | 92 | 68 | 62 | 66 | 55 | 51 | 66 | 87 | 51 | 78 | 79 | 45 |
| 300 | 47 | 46 | 39 | 60 | 41 | 36 | 40 | 35 | 28 | 38 | 50 | 31 | 52 | 45 | 27 |
| PV | 27 | 27 | 19 | 32 | 27 | 26 | 26 | 20 | 23 | 28 | 37 | 20 | 26 | 34 | 18 |
| YP | 20 | 19 | 20 | 28 | 14 | 10 | 14 | 15 | 5 | 10 | 13 | 11 | 26 | 11 | 9 |
| FL/O | NM | 3.6 | 72 | NM | 3.8 | 90 | NM | 54 | 82 | NM | 2.4 | 6.0 | NM | 2.8 | 4.8 |
| FL/W | | 0 | 0 | | 0 | 0 | | 0 | 10 | | 0 | 0 | | 0 | 0 |
| ES | 1038 | 711 | 291 | 1032 | 638 | 291 | 646 | 393 | 188 | 942 | 814 | 330 | 951 | 820 | 359 |

Explanations of terms in above Table: NM is Not Measured; BHR is before hot rolling; RPM is revolution per minute on VG 35 rheology meter; PV is calculated plastic viscosity as per API method; YP is calculated yield point as per API method; FL/O is oil in filtrate and fluid losses are measured in ml, FL/W is water in filtrate in ml; ES is emulsion stability numbers measured by ES meter according to API method. API methods and measurements are well known to those who are ordinary skilled in art.

The above data clearly demonstrate that the Formulation 4 and Formulation 5 prepared using novel, unsaturated mono carboxylic acid invert emulsifiers of this invention out performs currently known dicarboxylic or poly carboxylic acid based emulsifiers. The novel emulsifiers of the present invention are stable regardless of the fatty acid source used. Higher ES values and lower fluid losses without water in filtrate, after heat aging at 400° F. for 16 hours demonstrates the stability of the emulsion and superior performance.

To demonstrate the adaptability of the invert emulsifiers of this invention for application in various conditions, the following 16.7 ppg, 90/10 O/W ratio formulation was prepared and heat aged to 400° F. for 16 hours. Again, standard mixing procedure was used to prepare the drilling fluid formulation. The fluid formulation and performance data are given in following Tables 3.

TABLE 3

| Components | Quantity |
| --- | --- |
| Saraline 185 V | 134.745 ml |
| Gel Wet | 6.0 gms |
| Invert Emulsifier of Example IV | 10.0 gms |
| GS Clay Wp | 2.0 gms |
| Lime | 4.0 gms |
| Water | 21.033 ml |
| CaCl2 | 7.11 |
| GS Trol | 14.0 gms |
| Barite | 501.531 gms |
| Mud Weight | 16.7 ppg |
| Hot Rolling Temperature | 400 F. for 16 hrs |
| Oil Water Ratio | 90:10 |

This fluid formulation was hot rolled at 400° F. for 16 hrs: Rheological parameters measured at 120° F. are given in Table 4 below.

TABLE 4

| Temperature ° F. | Plastic Viscosity | Yield Point | HPHT Fluid loss, ml | Water ml | ES |
| --- | --- | --- | --- | --- | --- |
| Initial | 39 | 18 | — | 0 | 1195 |
| 400° F. | 81 | 41 | 2.4 ml | 0 | 1320 |

The above results demonstrate that the fluid formulations using zwitterionic ionic imidazoline invert emulsifiers made with unsaturated mono carboxylic acid of this invention are stable at temperatures in excess of 400° F.

To further demonstrate the utility of this invention, 10 ppg 70/30 O/W ratios fluid formulations were prepared and evaluated according to standard API procedures.

TABLE 5 gives the components used in formulating the test fluids.

| Components | Quantity |
| --- | --- |
| Saraline | 154.446 ml |
| Gel Wet | 4.0 gms |
| Invert Emulsifier (From Examples I-V) | 8.0 gms |
| GS Clay DP, Organo clay dry process | 8.0 gms |
| Lime | 4.0 gms |
| Water | 88.613 ml |
| CaCl2 | 29.954 |
| GS Trol | 8.0 gms |
| Barite | 114.4 gms |
| Mud Weight | 10 ppg |
| Hot Rolling Temperature | 250/300° F. for 16 hrs |
| Oil Water Ratio | 70:30 |

The above drilling fluid formulation were heat aged at 250 and 300° F. for 16 hours and the fluid parameters for the drilling fluids of Example III (Citric based), Example I (Fumaric based) and Example IV (Acrylic based) are given in tables 6-11 below.

TABLE 6

Test results of Example III (Citric acid based)

| Temperature ° F. | Plastic Viscosity | Yield Point | HPHT Fluid loss, ml | Water Ml | ES |
| --- | --- | --- | --- | --- | --- |
| Initial | 35 | 29 | — | — | 138 |
| 250° F. | 29 | 11 | 2.2 | 0 | 168 |
| 300° F. | Water Wet | N/A | N/A | N/A | |

TABLE 7

Test results of Example I (Fumaric Acid based))
In the above fluid the emulsifier is used based on example I and the results are as follows:

| Temperature ° F. | Plastic Viscosity | Yield Point | HPHT Fluid loss, ml | Water Ml | ES |
| --- | --- | --- | --- | --- | --- |
| Initial | 30 | 30 | | 0 | 223 |
| 250° F. | 28 | 9 | 1.6 | 0 | 123 |
| 300° F. | 26 | 12 | 2.8 ml | 0 | 186 |

TABLE 8

Test results of Example IV (Acrylic Acid)

| Temperature ° F. | Plastic Viscosity | Yield Point | HPHT Fluid loss, ml | Water ml | ES |
| --- | --- | --- | --- | --- | --- |
| Initial | 31 | 22 | — | 0 | 322 |
| 250° F. | 30 | 12 | 2 | 0 | 152 |
| 300° F. | 28 | 11 | 3.6 ml | 0 | 367 |

The above results indicate that 10.0 ppg 70/30 O/W ratio invert emulsion drilling fluids prepared with the novel emulsifier of this invention containing acrylic acid (Example IV) performed better than the currently known emulsifiers (Examples I and III), as indicated by higher ES values after heat aging at 300° F. for 16 hours.

The following is yet another example of drilling fluid formulations prepared and evaluated to demonstrate the superior performance of drilling fluid formulation of this invention.

Table 9 below provides details of fluid formulations of 13.0 ppg 80/20 O/W ratio:

TABLE 9

| Components | Quantity |
| --- | --- |
| Saraline 185 V Synthetic based Fluid | 157.4 ml |
| Gel Wet | 3.0 gms |
| Emulsifier (Example I, Example V) | 6.0 gms |
| GS Clay WP | 6.0 gms |
| Lime | 4.0 gms |
| Water | 51.927 ml |
| CaCl2 | 17.553 gms |
| GS Trol | 6.0 gms |
| Barite | 293.351 gms |
| Mud Weight | 13 ppg |
| Hot Rolling Temperature | 325° F. for 16 hrs |
| Oil Water Ratio | 80:20 |

The above fluid formulations were hot rolled at 325° F. for 16 hrs: Rheological parameters measured at 120° F.
Test results of formulation with Example I (Fumaric Acid based) are given in Table 10 below

TABLE 10

| Temperature ° F. | Plastic Viscosity | Yield Point | HPHT Fluid loss, ml | Water ml | ES |
| --- | --- | --- | --- | --- | --- |
| Initial | 26 | 18 | | 0 | 223 |
| 325° F. | 28 | 11 | 3.2 | 0 | 123 |

Test results of formulation with Example V (Acrylic acid based) are given in Table 11 below.

TABLE 11

| Temperature ° F. | Plastic Viscosity | Yield Point | HPHT Fluid loss, ml | Water ml | ES |
| --- | --- | --- | --- | --- | --- |
| Initial | 27 | 21 | — | 0 | 794 |
| 325° F. | 28 | 12 | 2.8 ml | 0 | 658 |

The above results reveal that the Zwitterionic imidazolines prepared from unsaturated mono carboxylic acid of this invention out performed currently known emulsifiers as indicated by high ES values after heat aging at 325° F.

CONCLUSION

The drilling fluid formulations prepared using invert emulsifiers of zwitterionic imidazoline of unsaturated mono carboxylic acid demonstrate superior performance as compared to drilling fluid formulations using currently known polyamides, amido amines and imidazolines emulsifiers.

The above test results demonstrate that the emulsifier of this invention can be used in drilling fluid formulations with a variety of oil water ratios and mud weights, and provides stable invert emulsion at temperature greater than 400° F. as evidenced by high emulsion stability numbers and low HTHP fluid losses without any water in filtrate.

What is claimed is:

1. An invert emulsion drilling fluid comprising:
a) a hydrocarbon continuous phase that is essentially free of esters;
b) an aqueous brine dispersed phase;
c) an alkalinity agent; and
d) a zwitterionic imidazoline invert emulsifier, said emulsifier being oil soluble, and is a reaction product of a fatty acid, a polyalkylene polyamine and an unsaturated monocarboxylic acid and having the formula:

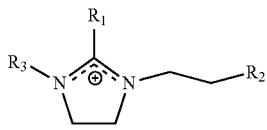

wherein R1 is an alkyl radical derived from the fatty acid;
R2 is a NH$_2$, NHCORI, OH, polyalkylene polyamine, or a mixture thereof;
R3 is an alkyl radical derived from the unsaturated mono-carboxylic acid containing 3-8 carbon atoms; and
wherein the zwitterionic imidazole invert emulsifier is in a concentration in the range of about 2-12 lbs/bbl of the drilling fluid.

2. The drilling fluid as in claim 1, wherein the hydrocarbon comprises diesel, mineral oil, or synthetic base hydrocarbon.

3. The drilling fluid as in claim 1, wherein the aqueous phase is divalent cationic brine.

4. The drilling fluid as in claim 3, wherein the divalent cationic brine is calcium chloride brine.

5. The drilling fluid as in claim 1, wherein the alkalinity agent comprises calcium hydroxide or magnesium hydroxide in quantity sufficient to neutralize acid functionality of invert emulsifier.

6. The drilling fluid as in claim 1, wherein the zwitterionic imidazoline invert emulsifier comprises fatty acid is derived from vegetable oil, tall oil, tallow oil, or mixtures thereof.

7. The drilling fluid as in claim 6, wherein the zwitterionic imidazoline invert emulsifier comprises fatty acid derived from vegetable oil.

8. The drilling fluid as in claim 1, wherein the zwitterionic imidazoline invert emulsifier comprises R1 being an alkyl group containing 14-22 carbon atoms.

9. The drilling fluid as in claim 1, wherein the zwitterionic imidazoline invert emulsifier comprises R2 being NH$_2$, OH, polyalkylene polyamine or a mixture thereof.

10. The drilling fluid as in claim 1, wherein the zwitterionic imidazoline invert emulsifier comprises R2 being NHCOR1, NH2, polyalkylene polyamine, or a mixture thereof.

11. The drilling fluid as in claim 1, wherein the zwitterionic imidazoline invert emulsifier comprises R2 being NH$_2$.

12. The drilling fluid as in claim 1, wherein the zwitterionic imidazoline invert emulsifier comprises a double bond of the unsaturated mono carboxylic acid conjugated to a carbonyl group of said carboxylic acid.

13. The drilling fluid as in claim 1, wherein the zwitterionic imidazoline invert emulsifier comprises unsaturated mono-carboxylic acid selected from a group comprising acrylic acid, methacrylic acid, 2-butenoic acid or 2-pentenoic acid.

14. The drilling fluid as in claim 13, wherein the unsaturated mono-carboxylic acid is acrylic acid.

15. The drilling fluid as in claim 1, wherein the zwitterionic imidazoline invert emulsifier is a reaction product of fatty acid derived from vegetable oil, diethylene triamine and acrylic acid.

16. The drilling fluid as in claim 1, comprising a zwitterionic imidazoline invert emulsifier salt derived by reacting the zwitterionic imidazoline invert emulsifier with calcium hydroxide or calcium oxide or magnesium hydroxide or magnesium oxide for neutralizing said emulsifier.

17. The drilling fluid as claimed in claim 1 comprising the hydrocarbon continuous phase in the range of about 40% to about 98% by volume.

18. The drilling fluid as claimed in claim 1 comprising an aqueous brine dispersed phase in the range of about 2% to about 60% by volume.

19. The drilling fluid as described in claim 18 comprising zwitterionic imidazoline invert emulsifier in the range of about 2-20 pounds per barrel.

20. The drilling fluid as described in claim 1, further comprising a weighing agent in a quantity sufficient to achieve a mud weight of the drilling fluid in the range of about 7 ppg to about 24 ppg.

21. The drilling fluid as described in claim 20, wherein said weighing agent is present in quantity up to about 800 pounds per barrel.

22. The drilling fluid as claimed in claim 1, wherein said invert emulsion drilling fluid performs effectively at temperatures exceeding 400° F.

* * * * *